United States Patent [19]
Kienböck et al.

[11] Patent Number: 5,560,209
[45] Date of Patent: Oct. 1, 1996

[54] ARRANGEMENT FOR IMPROVING EFFICIENCY OF A POWER PLANT

[75] Inventors: Martin Kienböck; Olivier Brasseur, both of Ratingen, Germany

[73] Assignee: BDAG Balcke-Dürr Aktiengesellschaft, Ratingen, Germany

[21] Appl. No.: 353,176

[22] Filed: Dec. 9, 1994

[51] Int. Cl.⁶ ............................. F01K 13/00; F22B 33/00
[52] U.S. Cl. .................... 60/645; 122/1 R; 122/20 B
[58] Field of Search ..................... 60/643, 645, 670; 122/1 R, 4 R, 20 B; 110/254

[56] References Cited

U.S. PATENT DOCUMENTS

| | | | |
|---|---|---|---|
| 2,883,832 | 4/1959 | Arnow | 60/655 |
| 3,148,665 | 9/1964 | Switzer, Jr. | 122/1 R |
| 4,205,630 | 6/1980 | Regan | 122/1 R |
| 4,223,640 | 9/1980 | Rochford et al. | 122/1 R |
| 5,320,070 | 6/1994 | Kienbock et al. | 122/1 R |

FOREIGN PATENT DOCUMENTS

| | | |
|---|---|---|
| 1109239 | 1/1956 | France . |
| 4222811 | 11/1993 | Germany . |
| 841040 | 7/1960 | United Kingdom . |
| 2138555 | 10/1984 | United Kingdom . |

Primary Examiner—Leonard E. Heyman
Attorney, Agent, or Firm—Robert W. Becker & Associates

[57] ABSTRACT

A device for increasing efficiency of a power plant operated by burning fossil fuel has a boiler for heating a process medium. An inlet line is connected to the boiler for feeding a first process gas in the form of combustion air into the boiler. An outlet line is connected to the boiler removing a second process gas in the form of flue gas from the steam generator. A heat exchanger for heating the combustion air by regaining some of the heat contained in the flue gas is provided. At least one device for preheating the combustion air is connected upstream of the heat exchanger. The device for preheating the combustion air preheats the combustion air with heat energy contained in the process medium which is at a low pressure level. At least one device for transferring a portion of the heat energy, introduced into the combustion air by preheating, from at least one of the process gases to the process medium at a high pressure level is provided. The device for transferring is connected so as to bypass the heat exchanger.

7 Claims, 2 Drawing Sheets

5,560,209

ARRANGEMENT FOR IMPROVING EFFICIENCY OF A POWER PLANT

BACKGROUND OF THE INVENTION

The present invention relates to an arrangement for improving the efficiency of a power plant operated by burning fossil fuel etc., wherein the combustion air is preheated by recovering a portion of the heat contained within the flue gas and wherein a portion of the heat energy contained within the flue gas and/or in the preheated combustion air is transferred to the process medium by bypassing the heat exchanger for heating the combustion air.

It is conventional in power plants operated by burning fossil fuel to preheat the combustion air to be introduced into the steam generator by recovering a portion of the heat energy contained within the flue gas of the steam generator. This recovering is carried out with recuperative or regenerative heat exchangers, for example, in the form of tube or plate heat exchangers or rotatably driven air preheaters. By partially using the heat energy contained within the flue gases for preheating the combustion air the efficiency of the power plant is increased.

In addition to this preheating step of the combustion air, it is known to transfer a portion of the heat energy contained within the flue gas onto the process medium by bypassing the combustion air preheating system for example, for heating the feed water or for generating steam which then can be used for external purposes or can be reintroduced into the power plant process.

It is therefore an object of the present invention to improve on the known arrangement for improving efficiency of a power plant that uses fossil fuel such that an additional increase of the efficiency can be attained.

cl SUMMARY OF THE INVENTION

A device for increasing efficiency of a power plant operated by burning fossil fuel according to the present invention is primarily characterized by:

A boiler for heating a process medium;

An inlet line connected to the boiler for feeding a first process gas in the form of combustion air into the boiler;

An outlet line connected to the boiler for removing a second process gas in the form of flue gas from the boiler;

A heat exchanger for heating the combustion air by recovering some of the heat energy contained in the flue gas;

At least one means for preheating the combustion air by heat energy contained in the process medium being at a low pressure level, the means for preheating connected upstream of the heat exchanger; and At least one means for transferring a portion of the heat energy, introduced into the combustion air by preheating, from at least one of the process gases to the process medium being at a high pressure level, the at least one means for transferring connected so as to bypass the heat exchanger.

Preferably, the means for preheating is supplied with process medium selected from the group consisting of low pressure feed water and low pressure steam and wherein the means for transferring is a high pressure heat transfer device for transferring a corresponding amount of heat energy introduced into the combustion air by preheating to the process medium selected from the group consisting of pressure feed water and high pressure steam.

Expediently, the heat exchanger comprises a plurality of heat exchanging stages at different temperature levels, wherein only one or more heat exchanging stages at higher temperature levels are bypassed by the at least one means of transferring.

The present invention also relates to a method for increasing efficiency of a power plant operated by burning fossil fuel, the method according to the present invention primarily characterized by the steps of:

Feeding a first process gas in the form of combustion air into a boiler;

Removing a second process gas in the form of flue gas from the boiler;

Heating the combustion air in a heat exchanger by recovering some of the heat energy contained in the flue gas;

Preheating the combustion air upstream of the heat exchanger with heat energy contained in the process medium being at a low pressure level; and Transferring a portion of the heat energy, introduced into the combustion air by preheating, from at least one of the process gases to the process medium that is at a high pressure level while bypassing the heat exchanger.

Advantageously, the step of preheating includes the step of supplying the process medium selected from the group consisting of low pressure feed water and low pressure steam and wherein in the step of transferring a high pressure heat transfer device is used and a corresponding amount of heat energy, introduced into the combustion air by preheating, is transferred to the process medium selected from the group consisting of high pressure feed water and high pressure steam.

Preferably, the step of heating includes the step of providing a plurality of heat exchanging stages at different temperature levels and wherein only one or more of the heat exchanging stages at higher temperature levels are bypassed.

According to the present invention, combustion air before entering the heat exchanger is preheated by the process medium at a low pressure level and the heat energy that is introduced into the combustion air by preheating in this manner is removed from the flue gas and/or the recirculating combustion air within the bypass of the heat exchanger in order to heat the process medium that is at a higher pressure level.

The technical working capacity of the heat energy transferred in the bypass of the heat exchanger from the flue gas, respectively, the recirculating combustion air onto the process medium at a higher pressure level is greater, due to the higher pressure level, than the technical working capacity of the same, or only slightly reduced heat energy that has been transferred from the process medium at the low pressure level onto the combustion air upstream of the heat exchanger. Thus, exclusively by this measure an improvement of the total efficiency of the power plant of approximately 0.5 to 1% results, i.e., an increase of electrical power output of the power plant by approximately 1 to 2%. The use of these different working capacities of the heat energy removed from the process medium in order to preheat the combustion air and of the heat energy removed from the flue gas and/or the combustion air recirculated in the bypass of the heat exchanger and transferred to the process medium at a greater pressure level thus inventively results in a considerable improvement of the efficiency of the power plant.

According to a special feature of the present invention, at least one low pressure preheater heated by low pressure feed water or low pressure steam is provided, and at least one high pressure heat transfer device is arranged in a bypass to the heat exchanger with which the heat energy introduced by the low pressure preheater, or at least a corresponding amount, is transferred to the high pressure feed water or high pressure steam. The low pressure heaters and the high pressure heat transfer devices, which may be a one-stage or multiple stage device, are conventional apparatus. The heat exchanger for heating the combustion air may also be designed in a conventional manner as a recuperative or regenerative heat exchanger.

In another preferred embodiment of the present invention the heat exchanger comprises multiple stages whereby only the one (or more) heat exchanging stage(s) at a higher temperature level is (are) bypassed.

BRIEF DESCRIPTION OF THE DRAWING

The object and advantages of the present invention will appear more clearly from the following specification in conjunction with the accompanying drawing, in FIG. 1 shows a schematic block diagram of the device of the present invention

DESCRIPTION OF PREFERRED EMBODIMENTS

Figure 1:
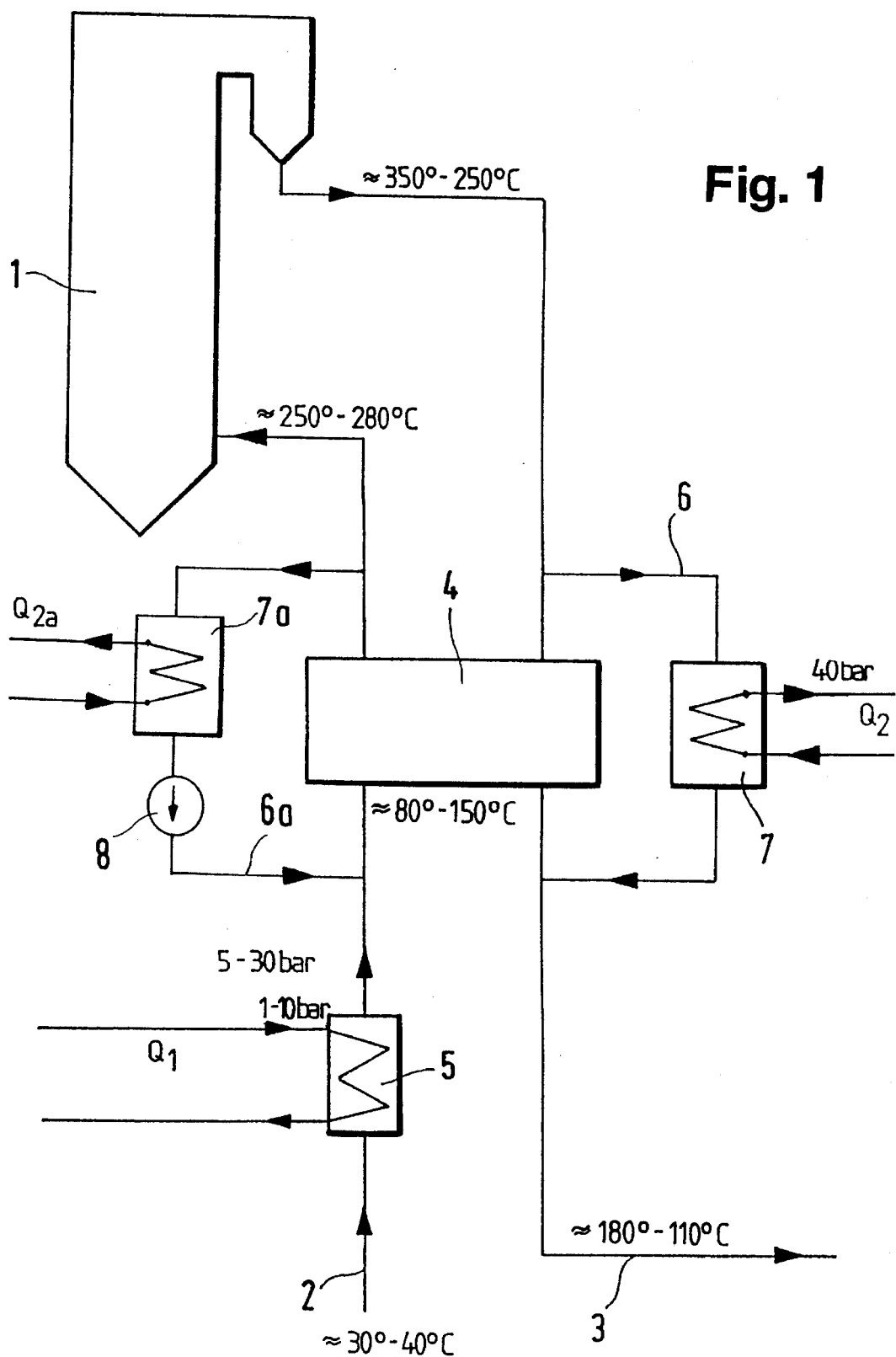
Figure 2:
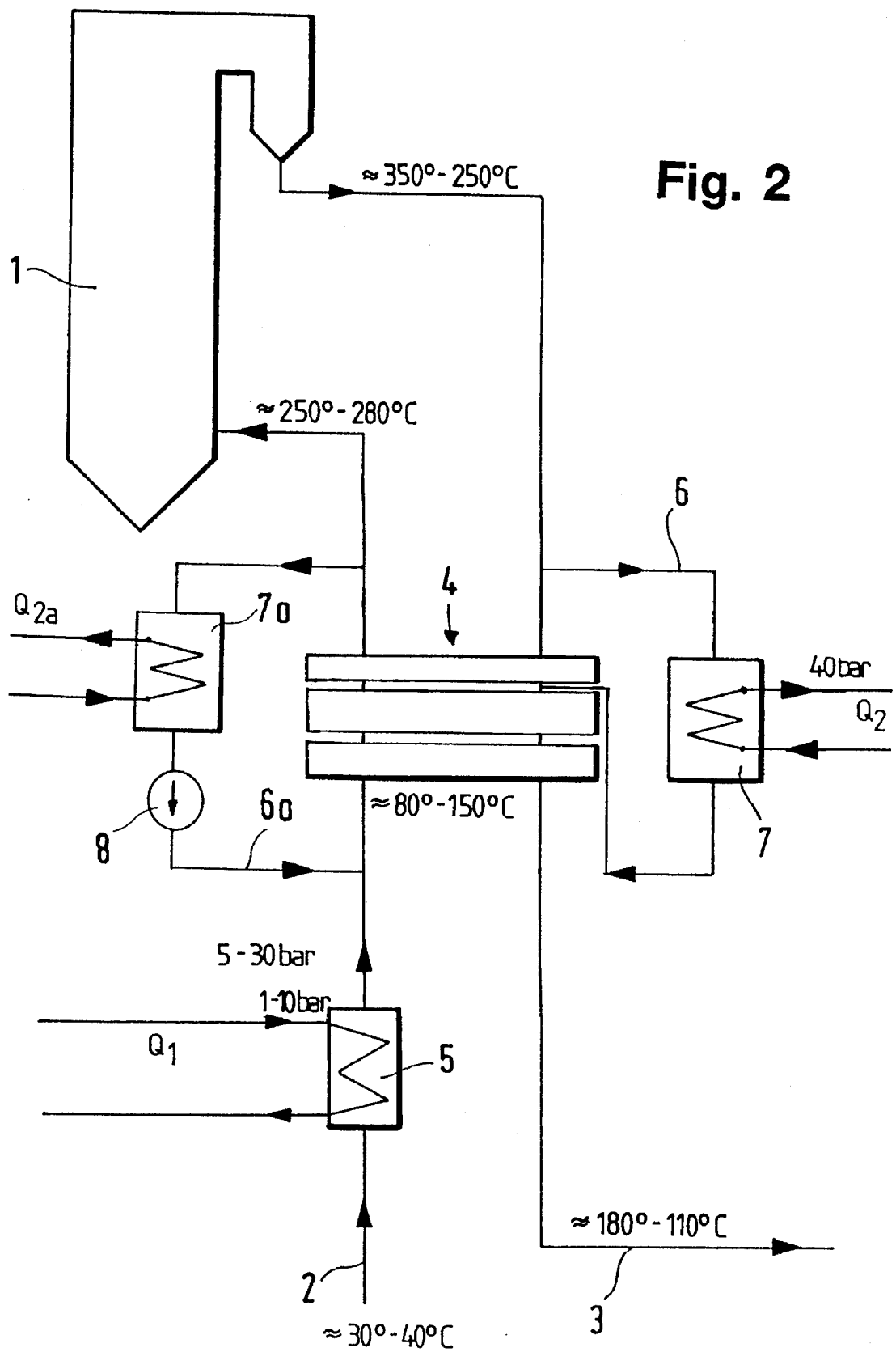
FIG. 2 shows a further embodiment with a plurality of combustion air heat exchangers.

The present invention will now be described in detail with the aid of a specific embodiment utilizing the only Figure.

The only Figure shows a steam generator (boiler) 1 which is supplied with combustion air through the combustion air inlet line 2 and from which flue gas is removed via the flue gas outlet line 3.

In order to be able to use a portion of the heat contained within the flue gas for heating the combustion air, a combustion air heat exchanger 4 is provided which is of a recuperative or regenerative design. Furthermore, within the combustion air inlet line 2 a low pressure preheater 5 is arranged. This low pressure preheater 5 is heated either with hot feed water or with low pressure steam in order to preheat the combustion air entering the combustion air inlet line 2 at a temperature of 30° to 40° C. to a temperature of 80° to 150° C. before feeding the combustion air into the combustion air heat exchanger 4. The feed water for heating the low pressure preheater 5 is in a pressure range of 5 and 30 bar. If it is desired to use low pressure steam for heating the low pressure preheater 5, the steam is at a pressure level of 1 and 10 bar.

In the combustion air heat exchanger 4 the combustion air is heated by the flue gas (exiting the steam generator 1 at a temperature of 350° to 250° C.) to a temperature range of 250° and 350° at which temperature level the combustion air enters the steam generator 1.

Since the heat energy $Q_1$ introduced into the combustion air via the low pressure preheater 5 at a low pressure level is to be removed at a higher pressure level from the flue gas, a bypass 6 is provided parallel to the flue gas outlet line 3 for bypassing the combustion air heat exchanger 4. Within the bypass 6 a high pressure heat transfer device 7 is arranged. With such a bypass 6 a portion of the flue gas stream bypasses the combustion air heat exchanger 4. The amoung of flue gas flowing through the bypass is selected such that a heat energy $Q_2$ is removed from the flue gas within the high pressure heat transfer device 7 that is theoretically identical, due to the unavoidable efficiency loses however slightly smaller, than the heat energy $Q_1$ that was introduced into the combustion air by the low pressure preheater 5. The heat energy $Q_2$ is transferred within the high pressure heat transfer device 7 onto the process medium being at a considerably higher pressure level, for example, onto feed water at a pressure of 250 bar and/or onto high pressure steam of a pressure between 2 and 40 bar.

The shown embodiment also includes a further high pressure heat transfer device 7a which is arranged in a bypass 6a of the combustion air heat exchanger 4 and is heated by combustion air that is recirculated by the blower 8. This high pressure heat transfer device 7a can be used in addition or as an alternative to the high pressure heat transfer device 7 and also serves, just as the device 7, to recover the heat energy $Q_{2a}$ at a higher pressure level. Both high pressure heat transfer devices 7, 7a can be designed to have one or multiple heat exchanging stages.

By recovering a portion of the heat energy contained in the flue gas with the aid of the combustion air heat exchanger 4 and of the heat energy $Q_2$ with the aid of the high pressure heat transfer device 7, the flue gas temperatures at the end of the flue gas outlet line 3 are within a range of 180° to 110°.

Since the technical work capacity of the heat energy $Q_2$ removed from the partial stream of the flue gas within the high pressure heat transfer device 7, respectively, within the high pressure heat transfer device 7a for the recirculating combustion air ($Q_{2a}$) is greater than the working capacity of the heat energy $Q_1$ introduced into the combustion air with the low pressure preheater 5, the inventive arrangement for improving the power plant efficiency results in an improvement of approximately 0.5 to 1%. The electrical energy of the power plant can be increased by approximately 1 to 2% with the disclosed embodiment simply by using the working capacity difference between the heat energy $Q_2$, respectively, $Q_{2a}$ at the higher pressure level and the heat energy $Q_1$ introduced at the lower pressure level.

The present invention is, of course, in no way restricted to the specific disclosure of the specification and drawings, but also encompasses any modifications within the scope of the appended claims.

What we claim is:

1. A device for increasing efficiency of a power plant operated by burning fossil fuel, said device comprising:

a boiler for heating a process medium;

an inlet line connected to said boiler for feeding a first process gas in the form of combustion air into said boiler;

an outlet line connected to said boiler for removing a second process gas in the form of flue gas from said boiler;

a heat exchanger for heating the combustion air by recovering some of the heat energy contained in the flue gas;

at least one means for preheating the combustion air by heat energy contained in the process medium being at a low pressure level, said means for preheating connected upstream of said heat exchanger; and at least one means for transferring a portion of said heat energy, introduced into the combustion air by preheating, from at least one of the process gases to the process medium being at a high pressure range, said at least one means for transferring connected so as to bypass said heat exchanger.

2. A device according to claim 1, wherein said means for preheating is supplied with process medium selected from the group consisting of low pressure feed water and low pressure steam and wherein said means for transferring is a high pressure heat transfer device for transferring said heat energy introduced into the combustion air by preheating to the process medium selected from the group consisting of high pressure feed water and high pressure steam.

3. A device according to claim 1, wherein said heat exchanger comprises a plurality of heat exchanging stages at different temperature levels, wherein at least one of said heat exchanging stages at higher temperature levels is bypassed by said at least one means of transferring.

4. A method for increasing efficiency of a power plant operated by burning fossil fuel, said method comprising the steps of:

feeding a first process gas in the form of combustion air into a boiler;

removing a second process gas in the form of flue gas from the boiler;

heating the combustion air in a heat exchanger by recovering some of the heat energy contained in the flue gas;

preheating the combustion air upstream of said heat exchanger with heat energy contained in the process medium being at a low pressure range; and transferring a portion of said heat energy, introduced into the combustion air by preheating, from at least one of the process gases to the process medium that is at a high pressure level while bypassing said heat exchanger.

5. A method according to claim 4, wherein said step of preheating includes the step of supplying the process medium selected from the group consisting of low pressure feed water and low pressure steam, and wherein in said step of transferring a high pressure heat transfer device is used and said heat energy, introduced into the combustion air by preheating, is transferred to the process medium selected from the group consisting of high pressure feed water and high pressure steam.

6. A device according to claim 4, wherein said step of heating includes the step of providing a plurality of heat exchanging stages at different temperature levels and wherein at least one of the heat exchanging stages at higher temperature levels is bypassed.

7. A method for increasing efficiency of a power plant operated by burning fossil fuel, said method comprising the steps of:

feeding a first process gas in the form of combustion air into a boiler;

removing a second process gas in the form of flue gas from the boiler;

heating the combustion air in a heat exchanger by recovering some of the heat energy contained in the flue gas; and transferring heat energy form a process medium at a low pressure level to a process medium at a high pressure level for increasing the technical working capacity of said heat energy by preheating the combustion air upstream of said heat exchanger with said heat energy contained in the process medium at low pressure level and heating the process medium at high pressure level with said heat energy withdrawn from at least one of the process gases in a bypass of said heat exchanger.

* * * * *

UNITED STATES PATENT AND TRADEMARK OFFICE
CERTIFICATE OF CORRECTION

PATENT NO. : 5,560,209
DATED : October 1, 1996
INVENTOR(S) : Kienböck et al

It is certified that error appears in the above-indentified patent and that said Letters Patent is hereby corrected as shown below:

On the title page insert the following:

[30]  Foreign Application Priority Data
  Dec. 10, 1993 [DE] Germany ........... 43 42 156.3

Signed and Sealed this

Twenty-first Day of January, 1997

Attest:

BRUCE LEHMAN

*Attesting Officer*   *Commissioner of Patents and Trademarks*